United States Patent
Hook et al.

(10) Patent No.: US 11,455,464 B2
(45) Date of Patent: Sep. 27, 2022

(54) DOCUMENT CONTENT CLASSIFICATION AND ALTERATION

(71) Applicant: Accenture Global Solutions Limited, Dublin (IE)

(72) Inventors: Ian Hook, Prague (CZ); Jose Eduardo Arias Quiros, Pueblo Nuevo (CR); Rebeca Gomez Vez, Cartago (CR); Marko Krema, Evanston, IL (US); Thomas A. Hsu, Bellaire, TX (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/574,948

(22) Filed: Sep. 18, 2019

(65) Prior Publication Data

US 2021/0081495 A1 Mar. 18, 2021

(51) Int. Cl.
| | |
|---|---|
| *G06F 40/205* | (2020.01) |
| *G06N 20/00* | (2019.01) |
| *G06N 5/04* | (2006.01) |
| *H04N 1/44* | (2006.01) |
| *G06F 40/30* | (2020.01) |
| *G06F 40/247* | (2020.01) |

(52) U.S. Cl.
CPC ......... *G06F 40/205* (2020.01); *G06F 40/247* (2020.01); *G06F 40/30* (2020.01); *G06N 5/04* (2013.01); *G06N 20/00* (2019.01); *H04N 1/448* (2013.01)

(58) Field of Classification Search
CPC ...... G06F 16/335; G06F 40/166; G06F 40/30; G06F 16/353; G06F 21/6245; G06F 2221/2141; G06F 40/16; G06F 40/205; G06F 40/216; G06F 40/247; G06N 20/00; G06N 7/005; G06N 5/04; H04N 1/448
See application file for complete search history.

(56) References Cited

U.S. PATENT DOCUMENTS

| | | | | |
|---|---|---|---|---|
| 8,200,661 B1 * | 6/2012 | Pearce | ................ | G06F 16/9535 |
| | | | | 707/721 |
| 8,751,424 B1 * | 6/2014 | Wojcik | .................. | G06F 21/554 |
| | | | | 706/20 |

(Continued)

OTHER PUBLICATIONS

Datametrics Software System, Inc., "The Best Software Solution", https://www.dmssys.com/, Aug. 23, 2017, 7 pages.

(Continued)

*Primary Examiner* — Wilson W Tsui
(74) *Attorney, Agent, or Firm* — Harrity & Harrity, LLP

(57) ABSTRACT

A device may receive a document including text, images, and one or more embedded documents. The device may parse the document to identify a content segment in the document. The device may determine a context for the content segment, wherein the context includes at least one of an entity identified by the content segment, a semantic meaning of the content segment, or an object identified by the content segment. The device may classify the content segment using a content classification model and based on the context for the content segment. The device may selectively alter the content segment based at least in part on a set of alteration rules, to generate a modified document. The device may provide the modified document based on selectively altering the content segment.

20 Claims, 9 Drawing Sheets

(56) References Cited

U.S. PATENT DOCUMENTS

| | | | |
|---|---|---|---|
| 8,949,242 B1* | 2/2015 | Lin | G06F 16/36 707/739 |
| 10,410,016 B1* | 9/2019 | Damick | G06F 40/30 |
| 2007/0271510 A1* | 11/2007 | Grigoriu | G06F 40/232 715/257 |
| 2008/0209313 A1* | 8/2008 | Gonser | G06F 40/186 715/255 |
| 2008/0209516 A1* | 8/2008 | Nassiri | H04L 9/3231 726/3 |
| 2010/0229246 A1* | 9/2010 | Warrington | G06F 21/6218 726/28 |
| 2011/0107205 A1* | 5/2011 | Chow | G06F 16/335 715/255 |
| 2011/0239113 A1* | 9/2011 | Hung | G16H 10/60 715/271 |
| 2011/0282862 A1* | 11/2011 | Loeb | G06F 21/6245 707/710 |
| 2012/0246696 A1* | 9/2012 | Bou | G06F 21/6254 726/1 |
| 2012/0303558 A1* | 11/2012 | Jaiswal | G06N 20/00 706/12 |
| 2012/0331517 A1* | 12/2012 | Wilcox | G06F 40/279 726/1 |
| 2015/0089357 A1* | 3/2015 | Vandervort | G06F 40/166 715/256 |
| 2016/0042061 A1* | 2/2016 | Sengupta | G06F 40/284 707/738 |
| 2016/0103812 A1* | 4/2016 | Badger | G06F 40/247 715/271 |
| 2019/0311022 A1* | 10/2019 | Fan | G06F 40/166 |

OTHER PUBLICATIONS

BrightFort LLC., "Doc Scrubber", https://www.brightfort.com/docscrubber.html, Oct. 21, 2008, 1 page.

OfficeGSX et al., "Using the Document Inspector", https://docs.microsoft.com/en-us/office/vba/library-reference/concepts/using-the-document-inspector, Jan. 1, 2019, 3 pages.

* cited by examiner

DOCUMENT CONTENT CLASSIFICATION AND ALTERATION

BACKGROUND

A device may store documents that include information, such as text, images, video, audio, and/or the like. Some documents may include embedded documents. For example, a textual document may include an embedded document that includes another textual document, a presentation document, an image document, a spreadsheet document, and/or the like. Document sanitization is a process in which sensitive information in a document is removed or in some other way obscured. For example, before publishing scientific data regarding a medical study, a device may use a list of names of participants in the medical study to find-and-replace (e.g., by removing) names that are included in the list of names. Similarly, when a document is transferred from a first system (e.g., an internal system of a company) to a second system (e.g., an external system that provides access to clients or customers of the company), a device may use a find-and-replace technique to remove pre-specified information from the document. For example, the device may remove information identifying company employees, information identifying company financials, information identifying other customers of the company, and/or the like that is included in a pre-specified list of information.

SUMMARY

According to some implementations, a method may include receiving, by a device, a document including at least one of text, images, and one or more embedded documents; parsing, by the device, the document to identify a content segment in the document, wherein the content segment is at least one of a text segment or an image, from at least one of the document or an embedded document of the one or more embedded documents, of the document; determining, by the device, a context for the content segment, wherein the context includes at least one of an entity identified by the content segment, a semantic meaning of the content segment, or an object identified by the content segment; classifying, by the device, the content segment using a content classification model and based on the context for the content segment, wherein the content segment is classified into a first type that is proposed to be altered or a second type that is proposed not to be altered; determining a suggested replacement for the first type of content segment; providing, for display via a user interface, information identifying the first type of content segment, the second type of content segment, and the suggested replacement; receiving, via the user interface, a set of selections of at least a portion of the first type of content segment or the second type of content segment or the suggested replacement; selectively altering, by the device, the content segment based at least in part on a set of alteration rules and the set of selections, to generate a modified document; and providing, by the device, the modified document based on selectively altering the content segment; updating the content classification model based on the set of selections; and storing the updated content classification model.

According to some implementations, a device may include one or more memories; and one or more processors, communicatively coupled to the one or more memories, configured to: receive a document; parse the document to identify a set of content segments in the document; determine a set of contexts for the set of content segments; classify the set of content segments using a content classification model and based on the set of contexts for the set of content segments, wherein a first subset of the set of content segments is classified into a type that is proposed to be altered, and a second subset of the set of content segments is classified into a type that is proposed not to be altered; determine a suggested replacement for the first subset of the set of content segments; alter the first subset of the set of content segments based at least in part on the suggested replacement to generate a modified document; and provide the modified document based on altering the first subset of the set of content segments.

According to some implementations, a non-transitory computer-readable medium may store one or more instructions. The one or more instructions, when executed by one or more processors of a device, may cause the one or more processors to: obtain a training data set including a plurality of documents; train, using the training data set and a machine learning technique, a content classification model; store the content classification model for use in classifying a document; receive, after storing the content classification model, the document; parse the document to identify a set of content segments in the document; determine respective a set of contexts for the set of content segments; classify the set of content segments using the stored content classification model, wherein a first subset of the set of content segments is classified into a first type that is proposed to be altered and a second subset of the set of content segments is classified into a second type that is proposed not to be altered; alter the first subset of the set of content segments based at least in part on the content classification model and the set of contexts, to generate a modified document; provide the modified document based on altering the first subset of the set of content segments; update the stored content classification model based on one or more alterations to the first subset of the set of content segments; and store the updated content classification model.

DETAILED DESCRIPTION

Figure 1A:
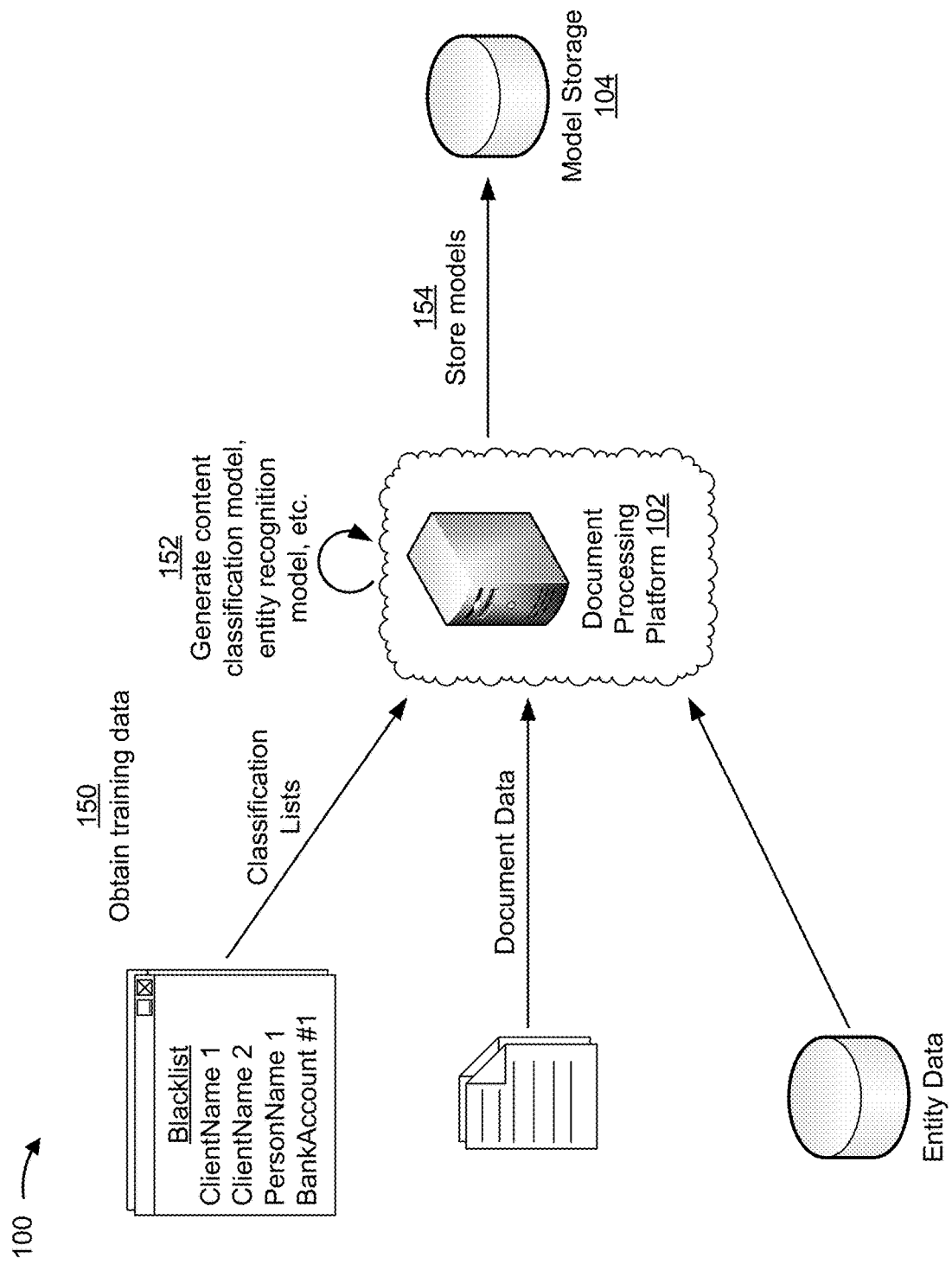
FIGS. 1A-1D are diagrams of an example implementation described herein.

The following detailed description of example implementations refers to the accompanying drawings. The same reference numbers in different drawings may identify the same or similar elements.

A document may include sensitive information, which may include private information, proprietary information, and/or other types of information, that is not to be provided to one or more recipients of the document. For example, a medical document may include private patient information that is viewable by a patient, a patient's healthcare provider, and/or the like, but is not to be disclosed to third parties. As another example, a legal document may include information that is viewable by a client of an attorney, the attorney, and/or the like, but is not to be disclosed to the public.

Documents may include sensitive information other than textual information. For example, an image may include some information that is permitted to be provided to all viewers of the image and some information that is not permitted to be provided to at least a subset of viewers. As an example, a map provider may intend to provide a photograph of a house as part of a street-mapping functionality, but may need to obscure other objects in the photograph, such as vehicle license plates, faces, and/or the like. In some cases, documents may have mixed privacy restrictions. For example, a particular document may include embedded documents that have different privacy restrictions than the particular document, different privacy restrictions than each other, and/or the like.

A device may redact or otherwise obscure information in a document. For example, a device may use a find-and-replace technique to find a set of words in a document and delete or replace the set of words. For example, a device may be configured to search for a patient's real name (e.g., using a pre-configured list of patient names), and replace the patient's real name with a generic name (e.g., that is specified in the pre-configured list or is included in another list identifying replacement terms).

However, using a static find-and-replace technique may result in failure to obscure or replace non-textual information, such as images, audio clips, video clips, and/or the like that may include sensitive information. Moreover, when there is an error in a document, the error may result in the device failing to recognize information for redaction. For example, when a patient's name is incorrectly listed (e.g., as a result of a typo, an error in optical character recognition, and/or the like), the device may fail to find the patient's name. As a result, identifying information may remain in a document after completing a find-and-replace based document sanitization procedure.

Furthermore, some information may be private information in a first context but public information in a second context. For example, when redacting an address, 'Java' may be private information when 'Java' refers to the island, but may be public information when 'Java' refers to the programming language or type of coffee. As another example, 'Washington' may be private information when 'Washington' refers to an address, but may be public information when 'Washington' refers to the historical person, is a metonym for, for example, the U.S. government, and/or the like. Another issue with find-and-replace based document sanitization is that redaction of information may result in an information content of a document falling below a threshold. For example, when a threshold amount of a document is redacted, the document may lack usefulness to a reader.

Some implementations described herein provide context-based document content classification and alteration. For example, a document processing platform may analyze a document, an embedded document within the document, and/or the like to identify content segments, such as images, textual segments, videos, audio clips, and/or the like. The document processing platform may determine a context for a content segment and may classify the content segment based on the context. For example, the document processing platform may determine a semantic meaning of 'Java' in a document based on information in the document and may determine whether to classify 'Java' as sensitive information relating to a person's address or non-sensitive information describing a programming language used for a software development project.

In this case, the document processing platform may automatically modify the document to redact, alter, or obscure sensitive information. For example, the document processing platform may replace 'Java' with 'Private Address' in the context of a person's address. In this case, the document processing platform may modify the document based on the context, thereby preserving an information content of the document (e.g., by automatically indicating that the redacted content segment was an address, thereby avoiding confusion regarding what was redacted). In this way, the document processing platform reduces a likelihood that a document becomes unusable as a result of excessive static redaction.

Additionally, or alternatively, for an image content segment, the document processing platform may recognize a person's face in an image and automatically obscure a portion of the image including the person's face. Additionally, or alternatively, based on results of processing and/or modifying the document, the document processing platform may update and improve a content classification model. For example, the document processing platform may update the content classification model to enable subsequent classification of a document segment and/or recommendation of a modification to the document segment to be improved. In this way, the document processing platform uses machine learning to further improve content classification for subsequent documents and obviates a need for generation of a static list associated with a find-and-replace technique.

In this way, the document processing platform improves an accuracy of document sanitization procedures relative to a static find-and-replace technique. Moreover, by improving an accuracy of document sanitization, the document processing platform obviates a need for manual review of automatic document sanitization and/or a need for manual document sanitization, thereby reducing a utilization of computing resources. Furthermore, the document processing platform may enforce a set of permissions in real-time, thereby enabling real-time information security for documents.

FIGS. 1A-1D are diagrams of an example implementation 100 described herein. As shown in FIG. 1A, example implementation 100 includes a document processing platform 102.

As further shown in FIG. 1A, and by reference number 150, document processing platform 102 may obtain training data. For example, document processing platform 102 may obtain one or more classification lists, document data identifying contents of a set of documents, entity data identifying information regarding one or more organizations, and/or the like. In some implementations, document processing platform 102 may obtain training data identifying a blacklist of terms. For example, document processing platform 102 may determine a set of terms that are to be redacted, obscured, or replaced in documents that are to be processed. In this case, document processing platform 102 may use the blacklist as data for training a content classification model to use context to determine whether a blacklisted term is associated with a first context, in which the blacklisted term is to be redacted, or a second context, in which the blacklisted term is not to be redacted. As an example, a blacklist may include one or more trademarked names, which, when used as generic names, may be omitted from redaction despite being on the blacklist. In this way, document processing platform 102 improves document sanitization relative to using a blacklist for a find-and-replace procedure, in which context is not used.

Additionally, or alternatively, document processing platform 102 may obtain a whitelist of terms. In this case, the whitelist may include a list of generic terms that are not to be redacted, but may be redacted when document processing platform 102 determines that, in context, a term is not a generic term, but instead a part of an address. Additionally, or alternatively, document processing platform 102 may obtain a blacklist, a whitelist, and/or the like of other content. For example, document processing platform 102 may obtain a whitelist of icons that are to be preserved in a document, such as generic icons that are not to be classified as privileged information. In some implementations, document processing platform 102 may obtain a classification list (e.g., a blacklist, a whitelist, and/or the like) from a particular source. For example, document processing platform 102 may obtain the classification list from a data structure storing names of clients of an organization, and may determine that the classification list is a blacklist based on permission data indicating that names of clients of the organization is privileged information. In this case, document processing platform 102 may communicate with, for example, a server storing information from which to generate a classification list, to determine a level of permission of the server, and may determine a type of the classification list based on the level of permission.

In some implementations, document processing platform 102 may train one or more models without obtaining any pre-made classification list. For example, document processing platform 102 may generate a classification list by parsing a server to identify clients of an organization based on a file structure of the server. In this case, document processing platform 102 may generate a classification list for use in training a content classification model, thereby obviating a need for a user-created classification list.

In some implementations, document processing platform 102 may obtain document data identifying a set of processed documents. For example, document processing platform 102 may obtain document data identifying a document for which a document sanitization procedure has been performed to remove, alter, or obscure privileged information in the document. In this case, document processing platform 102 may obtain information identifying an original version of the document, a sanitized version of the document, and/or the like to enable a determination of which content in the document (e.g., which terms, images, audio clips, video clips, and/or the like) has been removed, altered, or obscured, one or more contexts of the content in the document, and/or the like.

In some implementations, document processing platform 102 may receive entity data regarding an organization for which document processing is to be performed. For example, document processing platform 102 may obtain information identifying an industry of the organization, a set of employees of the organization, a set of tasks of the organization, a set of clients of the organization, a set of projects being or having been completed by the organization, and/or the like. Additionally, or alternatively, document processing platform 102 may obtain entity data regarding one or more organizations similar to the organization. For example, document processing platform 102 may determine a similarity score based on a similarity of industry, task, client, project, and/or the like, and may obtain data regarding the one or more other organizations.

In this case, document processing platform 102 may use entity data to identify one or more similar organizations, and may obtain document data relating to the one or more similar organizations to use in generating one or more models for processing documents of the organization, as described in more detail herein. In this way, document processing platform 102 reduces a utilization of processing resources to generate a model, network resources to obtain data for a model, memory resources to store data for a model, and/or the like relative to obtaining all available document data for all available organizations. Moreover, based on generating the one or more models using data relating to the organization and/or similar organizations, document processing platform 102 improves an accuracy of the model in processing documents of the organization relative to including data associated with unrelated organizations that may have different data privacy rules, different terminologies, and/or the like.

As further shown in FIG. 1A, and by reference number 152, document processing platform 102 may generate a content classification model, an entity recognition model, and/or the like. For example, document processing platform 102 may generate the content classification model to enable classification of content into a type of content that is to be altered, redacted, or obscured, a type of content that is to remain unaltered, unredacted, or unobscured, a sub-class thereof, another type of content, and/or the like. In this way, document processing platform 102 trains a model to use contextual information to perform document sanitization, thereby improving document sanitization relative to find-and-replace techniques. In some implementations, document processing platform 102 may obtain the content classification model from another source and use the content classification model based on obtaining the content classification model.

In some implementations, document processing platform 102 may generate the content classification model using a machine learning technique. For example, document processing platform 102 may divide the document data, the classification lists, and/or the like into a training set, a verification set, and/or the like. In this case, document processing platform 102 may use the training set to train the content classification model to classify whether textual content, image content, audio content, video content, and/or the like is to be assigned to a particular type based on a semantic meaning determined using contextual information. Additionally, or alternatively, document processing platform 102 may train the content classification model to enable a determination of a type of modification to use on a particular sub-type of content. For example, document processing platform 102 may use document data indicating that a first term is redacted and a second term is replaced with a third term, to train the content classification model to classify the first term and/or similar terms as a sub-type that is to be redacted and to classify the second term and/or similar terms as a sub-type that is to be replaced with a third term and/or similar terms. In some implementations, document processing platform 102 may use an open source model rather than generating a model. For example, document processing platform 102 may use a DBpedia model and/or the like.

In some implementations, document processing platform 102 may train an entity recognition model. For example, document processing platform 102 may train the entity recognition model using document data, classification lists, and/or the like to identify entities, such as organizations, persons, locations, and/or the like within documents. In this case, document processing platform 102 may use the entity recognition model as a part of the content classification model, which may determine whether a particular recognized entity is to be modified or is to remain un-modified. As an example, document processing platform 102 may use the entity recognition model to identify, in a document, a name of an organization that generated the document, and a name of a client of the organization in the document. In this case, document processing platform 102 may use the content classification model to determine that the name of the organization is to remain in the document, but the name of the client is to be modified in the document in order to sanitize the document.

In some implementations, document processing platform 102 may train the content classification model using one or more other data sets. For example, document processing platform 102 may train the content classification model using a dictionary, a thesaurus (e.g., a published thesaurus, a generated thesaurus based on document data, a generated thesaurus based on a word-to-vector model, and/or the like), an encyclopedia, a set of regular expressions, a taxonomy of company functions, a taxonomy of company projects, and/or the like to enable a determination of a context of a content segment, and a classification of the content segment into a particular class (e.g., whether the content segment is sensitive information or non-sensitive information).

As further shown in FIG. 1A, and by reference number 154, document processing platform 102 may store one or more models for subsequent use in processing a document. For example, document processing platform 102 may store the content classification model, the entity recognition model, and/or the like for subsequent use in processing documents. Additionally, or alternatively, document processing platform 102 may provide the one or more models to one or more client devices for local use in processing documents.

Figure 1B:
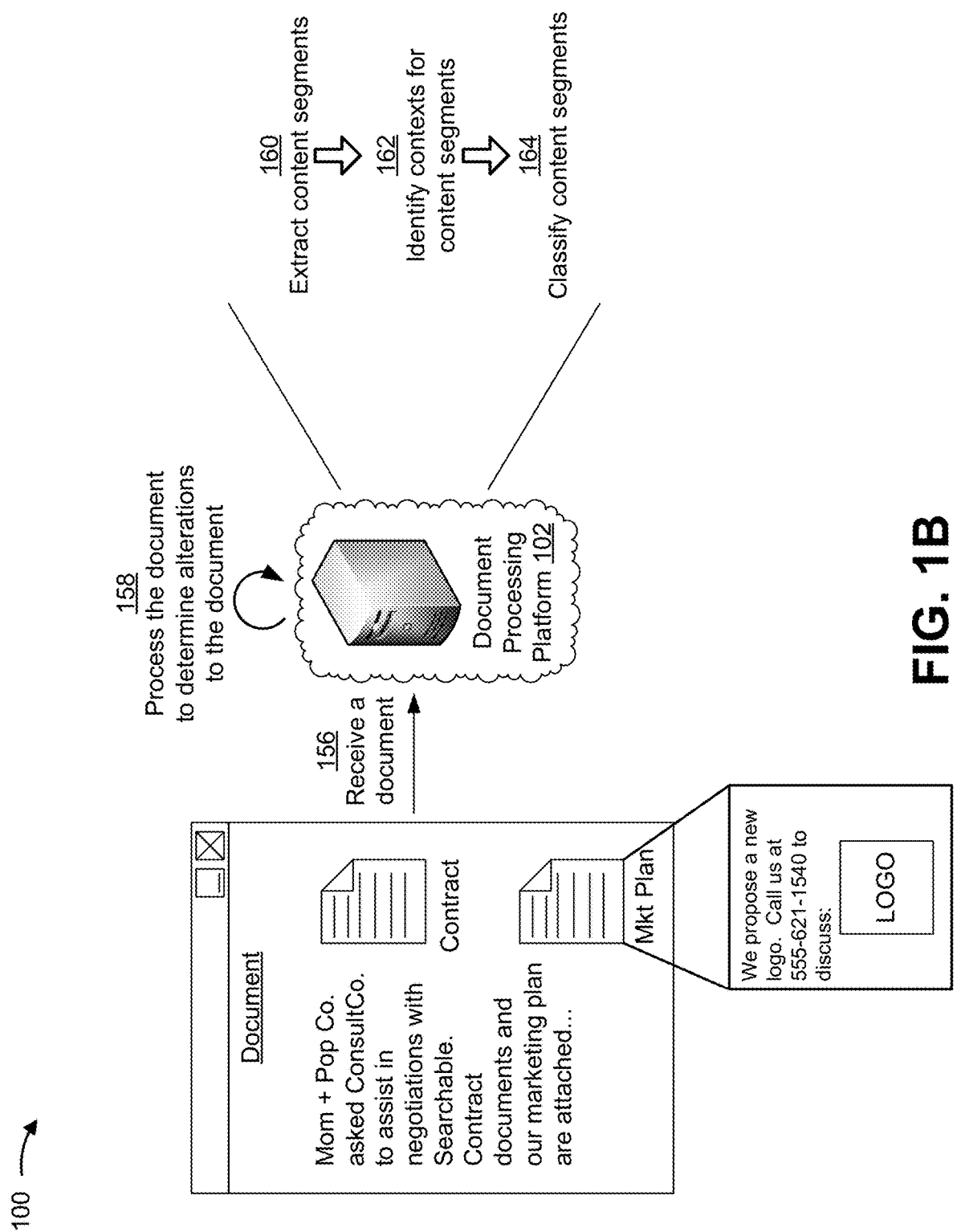

As shown in FIG. 1B, and by reference number 156, document processing platform 102 may receive a document. For example, document processing platform 102 may receive a document for processing and document sanitization. In some implementations, document processing platform 102 may receive a document that includes a particular type of content. For example, document processing platform 102 may receive a document that includes textual content, image content, audio content, video content, and/or the like. Additionally, or alternatively, document processing platform 102 may receive a document that includes multiple types of content. For example, document processing platform 102 may receive a document that includes textual content and image content.

In some implementations, document processing platform 102 may receive a particular type of document. For example, document processing platform 102 may receive a word processing document (e.g., a '.doc', '.docx', '.msg', '.txt', and/or the like), an image editing document (e.g., a '.img', a '.jpg', and/or the like), a spreadsheet document (e.g., a '.xls', '.xlsx', '.xlsm', '.xltx', and/or the like), a portable document format (e.g., a '.pdf') document, a compressed document (e.g., a '.zip') file, a presentation document (e.g., a '.ppt', '.pptx', and/or the like), an extensible markup language (e.g., a '.xml') document, a code document (e.g., in a particular code language, such as a '.java', '.c++', '.obj', '.class', and/or the like), an audio document (e.g., a '.mp3' or '.wav' file), a video document (e.g., a '.mp4' or '.mpeg' file), and/or the like. In some implementations, document processing platform 102 may receive a document that includes one or more other documents. For example, document processing platform 102 may receive a document that includes a set of embedded documents, a set of linked documents, and/or the like. In this case, document processing platform 102 may process the set of embedded documents, the set of linked documents, and/or the like to extract content stored therein, as described in more detail herein. Additionally, or alternatively, document processing platform 102 may extract document properties as content segments for selective modification, document backgrounds as content segments for selective modification, and/or the like.

In some implementations, document processing platform 102 may monitor a document. For example, document processing platform 102 may monitor a client device on which a document is being dynamically generated (e.g., by user input, using an algorithm, such as a speech-to-text algorithm to generate a transcript of an audio clip, and/or the like), and may continuously or periodically process the dynamically generated document to sanitize the dynamically generated document. In some implementations, document processing platform 102 may monitor an information stream. For example, document processing platform 102 may monitor a website, a set of email communications, a set of chat communications and/or the like to determine whether a document, an update to a document, a communication, and/or the like includes sensitive information, and redact the sensitive information in real-time.

In some implementations, document processing platform 102 may obtain other information relating to the document. For example, document processing platform 102 may receive an indication of a user that provided the document, a project to which the document relates, a type of the document, a context for the document, a blacklist or whitelist for the document, and/or the like. In this way, document processing platform 102 may customize document sanitization to the document, thereby improving document sanitization relative to static find-and-replace.

As further shown in FIG. 1B, and by reference number 158, document processing platform 102 may process the document to determine alterations to the document. For example, as shown by reference numbers 160, 162, and 164, document processing platform 102 may extract content segments, identify contexts for the content segments, classify the content segments, and/or the like. In some implementations, document processing platform 102 may use a particular set of techniques to process the document. For example, to extract content segments, document processing platform 102 may use a natural language processing technique. In this case, document processing platform 102 may identify individual words, multi-word phrases, sentences, paragraphs, and/or the like as individual content segments. Additionally, or alternatively, for audio clips, document processing platform 102 may convert the audio clips to text using a speech-to-text functionality, and may extract textual content segments based on converting the audio clips to text. Additionally, or alternatively, document processing platform 102 may extract different portions of an audio clip, such as different frequencies, different repeating sounds, and/or the like as audio content segments. Additionally, or alternatively, document processing platform 102 may extract images as content segments, portions of images that include objects (e.g., using an object recognition and/or image processing technique) as content segments, and/or the like.

Based on extracting content segments, document processing platform 102 may identify contexts for the content segments, in some implementations. For example, document processing platform 102 may determine, using the content classification model, a semantic meaning of a word based on other words in the document (e.g., using a natural language processing technique). Additionally, or alternatively, document processing platform 102 may determine whether a word corresponds to an entity, using an entity recognition model. Additionally, or alternatively, document processing platform 102 may determine a semantic content of an image (e.g., based on words within a proximity to the image in the document, based on performing object recognition to determine objects within the image), and/or the like. Additionally, or alternatively, document processing platform 102 may determine a semantic content of an audio clip (e.g., words in the audio clip, a speaker of the audio clip, a type of object making a sound in an audio clip, and/or the like). Additionally, or alternatively, document processing platform 102 may determine a semantic content of a video clip (e.g., objects in the video clip, gestures being performed in the video clip, and/or the like).

In some implementations, document processing platform 102 may classify content segments into a type, a sub-type, and/or the like using the content classification model. For example, based on a context of a textual content segment, document processing platform 102 may classify the textual content segment has having non-sensitive information that is not to be replaced, obscured, or redacted. Additionally, or alternatively, document processing platform 102 may classify the textual content segment as having sensitive information (e.g., a name, an email address, a client name, a monetary amount, a phone number, a location identifier, and/or the like), that is to be replaced, obscured, or redacted. In some implementations, document processing platform 102 may classify a portion of a content segment as sensitive information. For example, document processing platform 102 may classify a portion of an image (e.g., an icon providing sensitive information, such as information identifying a company, a person, an address, and/or the like) as sensitive information to be replaced, obscured, or redacted.

In some implementations, document processing platform 102 may predict a likelihood that a content segment is a particular type. For example, document processing platform 102 may generate a score representing a likelihood that the content classification model has correctly assigned a content segment to a particular type or sub-type. In this case, document processing platform 102 may determine, based on the score satisfying a threshold, to provide a recommendation relating to classifying the content segment to the particular type or sub-type. In some implementations, document processing platform 102 may account for imperfect versions of a content segment. For example, document processing platform 102 may determine the score for a textual content segment (e.g., that includes a typo) and based on the score satisfying a threshold, may predict that the textual content segment is of a type corresponding to another version of the textual content segment (e.g., without the typo). In this way, document processing platform 102 enables document sanitization of documents that include errors, thereby improving document sanitization relative to find-and-replace based techniques. Moreover, based on using a scoring to account for errors, document processing platform 102 obviates a need to include every possible variant of, for example, a word in a find-and-replace list, thereby reducing an amount of data storage required to store a find-and-replace list that can successfully sanitize an error filled document.

Figure 1C:
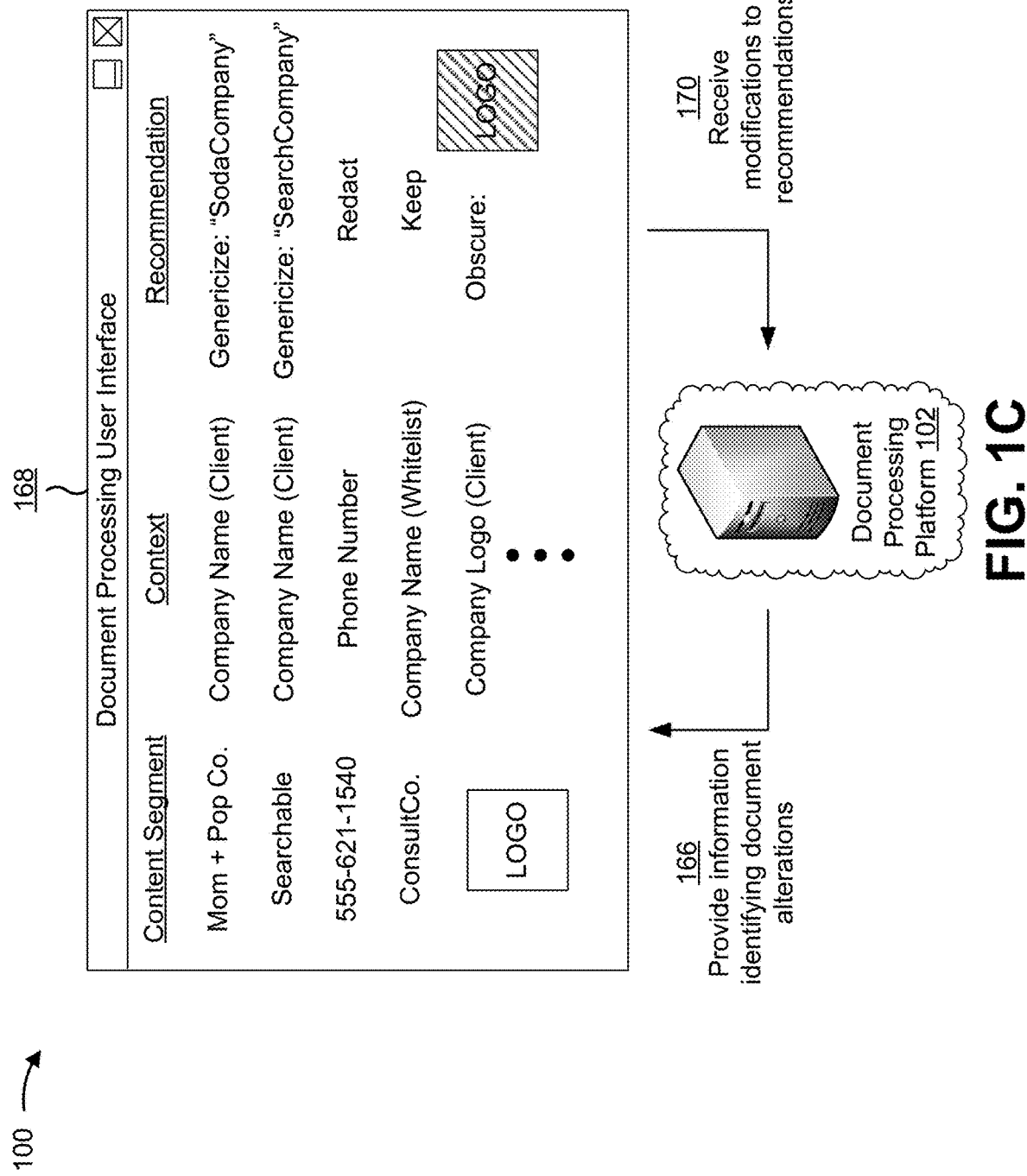

As shown in FIG. 1C, and by reference number 166, document processing platform 102 may provide information identifying recommendations of a set of alterations to the document. For example, document processing platform 102 may provide a user interface 168 for display via a device to identify the recommendations. In some implementations, document processing platform 102 may provide another document identifying the set of recommendations. For example, document processing platform 102 may provide a spreadsheet document identifying the set of recommendations to enable a user to view the set of recommendations. In this case, based on a user editing the spreadsheet document, document processing platform 102 may determine which recommendations to implement and/or which recommendations are to be modified, as described in more detail herein.

In some implementations, document processing platform 102 may provide information identifying a content segment and a context for the content segment. For example, document processing platform 102 may provide information identifying a word or set of words (e.g., 'Mom+Pop Co.') and a determined context for the word or set of words (e.g., other words in proximity to the word or set of words, that the word or set of words identifies a company name of a client of an organization). In this case, document processing platform 102 may provide a recommendation based on the context (e.g., that the content segment be replaced with a genericized version of the content segment). In this case, document processing platform 102 may select the recommendation to minimize a loss of semantic meaning. For example, rather than redacting the content segment (e.g., removing all semantic meaning) or using the context for a replacement of the content segment (e.g., replacing 'Mom+Pop Co.' with 'Company Name', which removes a relatively large amount of semantic meaning), document processing platform 102 may generate a generic version of the content segment to preserve a relatively large amount of semantic meaning (e.g., 'SodaCompany', which provides more semantic meaning than 'Company Name'). In this way, document processing platform 102 minimizes an amount of information loss during document sanitization, thereby improving document sanitization relative to redaction of all sensitive information.

Additionally, or alternatively, document processing platform 102 may provide a recommendation relating to redacting, obscuring, or replacing image content segments. For example, document processing platform 102 may provide a recommendation to blur an image content segment (e.g., a detected logo), a portion of an image content segment (e.g., a detected word, face, or object), and/or the like. In this way, document processing platform 102 enables multimedia content to be sanitized in a document sanitization procedure, thereby improving document sanitization relative to static find-and-replace based document sanitization techniques.

As further shown in FIG. 1C, and by reference number 170, based on providing document processing user interface 168, document processing platform 102 may receive modifications to the recommendations. For example, based on receiving user input indicating a change to a recommendation (e.g., a decision to override a recommendation by not redacting a phone number or a decision to modify a recommendation by altering a replacement term), document processing platform 102 may update the modified document. In this case, document processing platform 102 may store information identifying the user input for use in updating the content classification model, thereby enabling supervised machine learning to continue to train the content classification model.

Figure 1D:
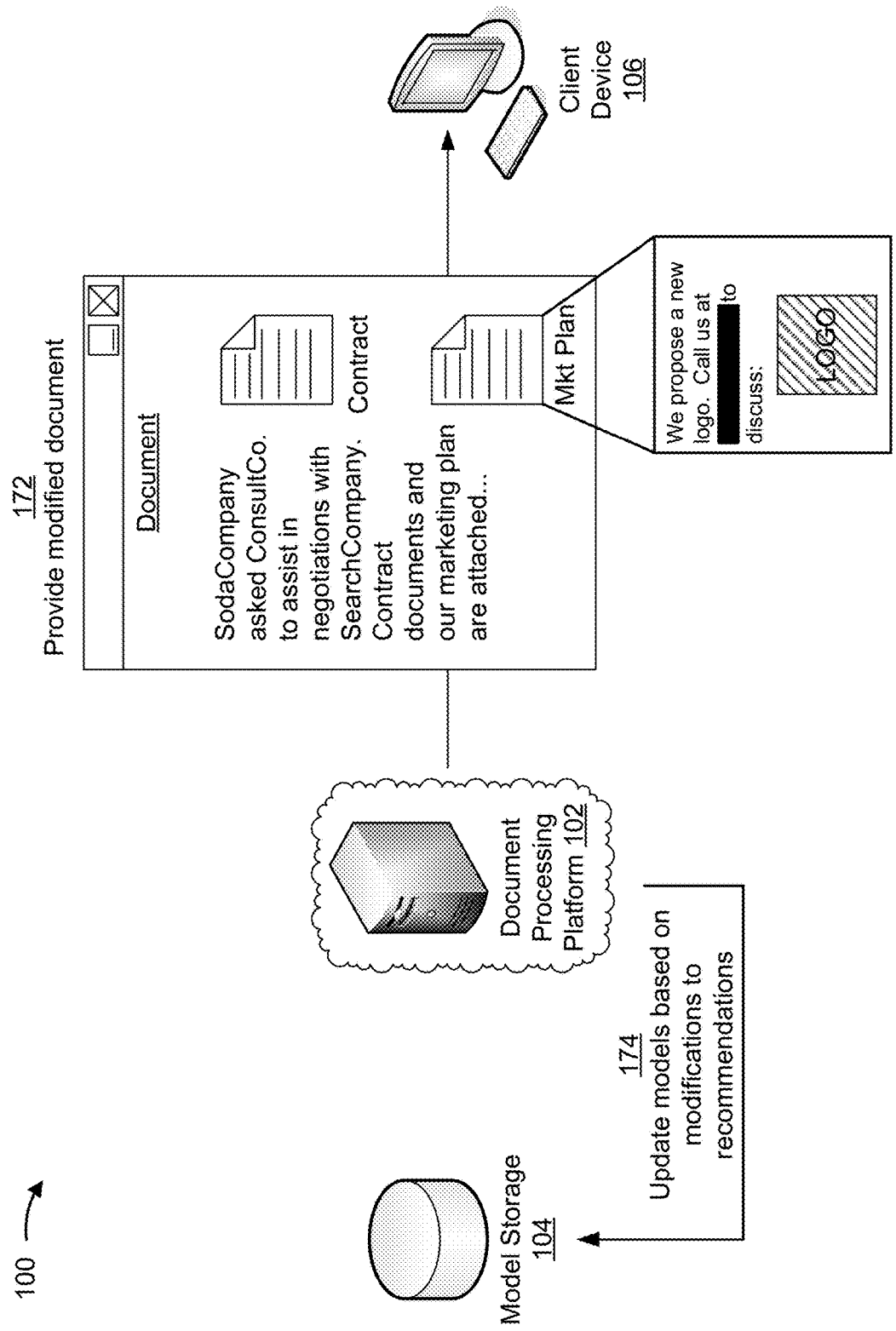

As shown in FIG. 1D, and by reference number 172, document processing platform 102 may provide a modified document to client device 106 for display. For example, document processing platform 102 may provide the modified document for display to one or more users of client device 106. In some implementations, document processing platform 102 may automatically perform an action, such as publishing the modified document. For example, document processing platform 102 may make the modified document accessible on a website, on a server, on an intranet, and/or the like. In some implementations, document processing platform 102 may provide different versions of the modified document to different users of different client devices 106. For example, document processing platform 102 may provide a first version of the modified document, with a first set of content segments modified, to a first user with a first permission level, and a second version of the modified document with a second set of content segments modified to a second user with a second permission level.

As further shown in FIG. 1D, and by reference number 174, document processing platform 102 may update one or more models based on the modifications to the recommendations. For example, document processing platform 102 may alter the content classification model based on a user selection of a different modification to a content segment, may add an entity to a data structure storing entities to identify in documents for alteration, and/or the like. In this way, an accuracy of subsequent document processing is improved relative to a static find-and-replace technique for document sanitization. In some implementations, document processing platform 102 may populate a blacklist or a whitelist based on the modifications to the recommendations. For example, document processing platform 102 may generate a whitelist of terms for which a recommendation was rejected, thereby reducing a quantity of terms that are to be processed using a content classification model during a subsequent document sanitization procedure. Additionally, or alternatively, document processing platform 102 may generate and/or modify a taxonomy, a set of regular expressions, and/or the like based on modifications to the recommendations, and may update the content classification model based on generating and/or modifying the taxonomy, the set of regular expressions, and/or the like. In some implementations, document processing platform 102 may update the content classification model on a user-specific or organization-specific basis. For example, document processing platform 102 may customize the content classification model based on user preferences derived from user modifications to the recommendations. In this case, document processing platform 102 may provide, when processing a document, a first recommendation to a first user and a second, different recommendation to a second user based on respective user preferences. In this way, document processing platform 102 enables user-differentiation of document sanitization, which may enable accounting for differences in user-writing styles, differences in user-needs with regard to document sanitization, and/or the like.

As indicated above, FIGS. 1A-1D are provided merely as one or more examples. Other examples may differ from what is described with regard to FIGS. 1A-1D.

Figure 2:
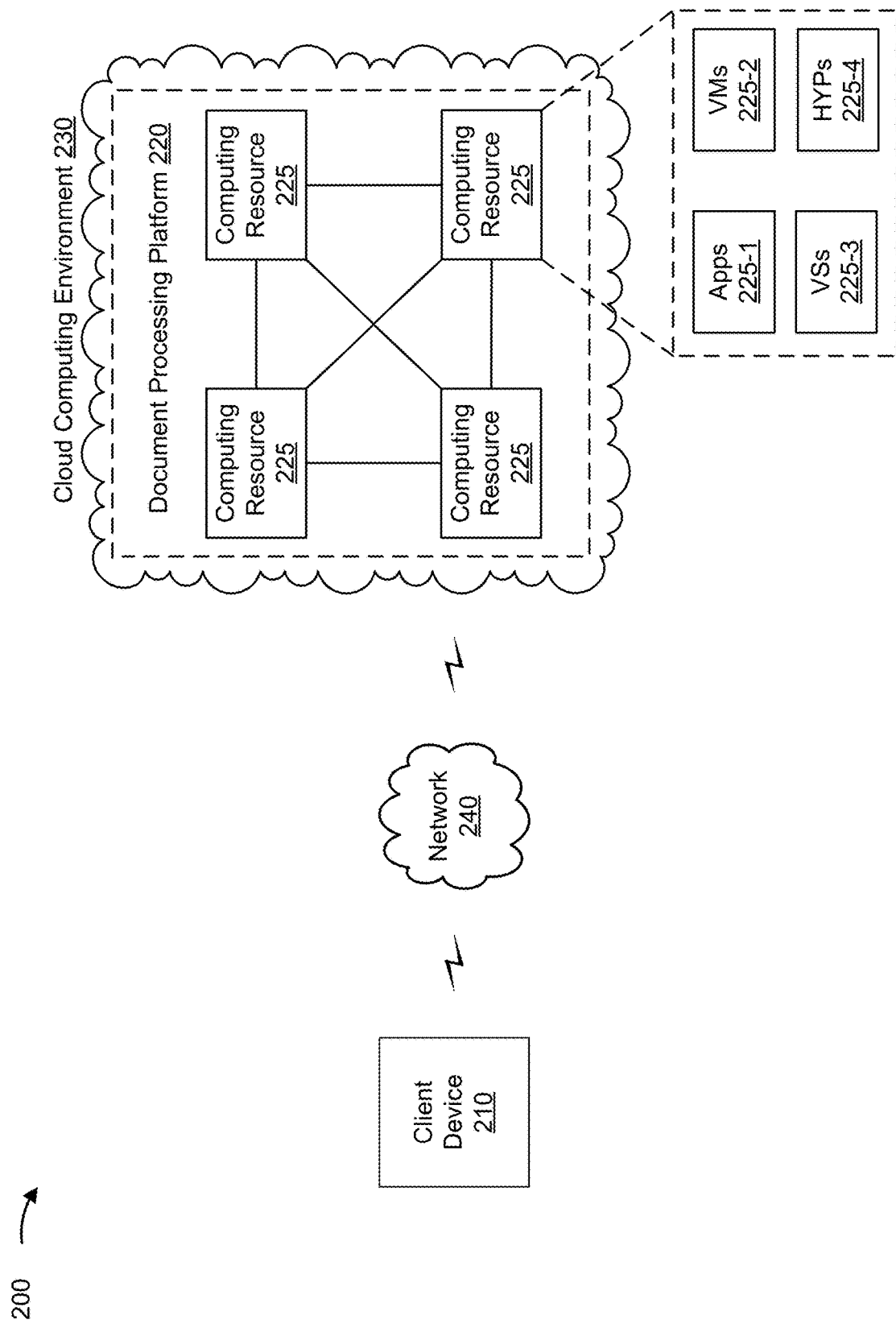
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a document processing platform 220, a computing resource 225, a cloud computing environment 230, and a network 240. Devices of environment 200 may interconnect via wired connections, wireless connections, or a combination of wired and wireless connections.

Client device 210 includes one or more devices capable of receiving, generating, storing, processing, and/or providing information associated with document sanitization. For example, client device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Document processing platform 220 includes one or more computing resources assigned to sanitize a document. For example, document processing platform 220 may be a platform implemented by cloud computing environment 230 that may sanitize a document. In some implementations, document processing platform 220 is implemented by computing resources 225 of cloud computing environment 230.

Document processing platform 220 may include a server device or a group of server devices. In some implementations, document processing platform 220 may be hosted in cloud computing environment 230. Notably, while implementations described herein may describe document processing platform 220 as being hosted in cloud computing environment 230, in some implementations, document processing platform 220 may be non-cloud-based or may be partially cloud-based.

Cloud computing environment 230 includes an environment that delivers computing as a service, whereby shared resources, services, and/or the like may be provided to sanitize a document. Cloud computing environment 230 may provide computation, software, data access, storage, and/or other services that do not require end-user knowledge of a physical location and configuration of a system and/or a device that delivers the services. As shown, cloud computing environment 230 may include document processing platform 220 and computing resource 225.

Computing resource 225 includes one or more personal computers, workstation computers, server devices, or another type of computation and/or communication device. In some implementations, computing resource 225 may host document processing platform 220. The cloud resources may include compute instances executing in computing resource 225, storage devices provided in computing resource 225, data transfer devices provided by computing resource 225, and/or the like. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by client device 210. Application 225-1 may eliminate a need to install and execute the software applications on client device 210. For example, application 225-1 may include software associated with document processing platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program and may support a single process. In some implementations, virtual machine 225-2 may execute on behalf of a user (e.g., client device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the "guest operating systems" and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
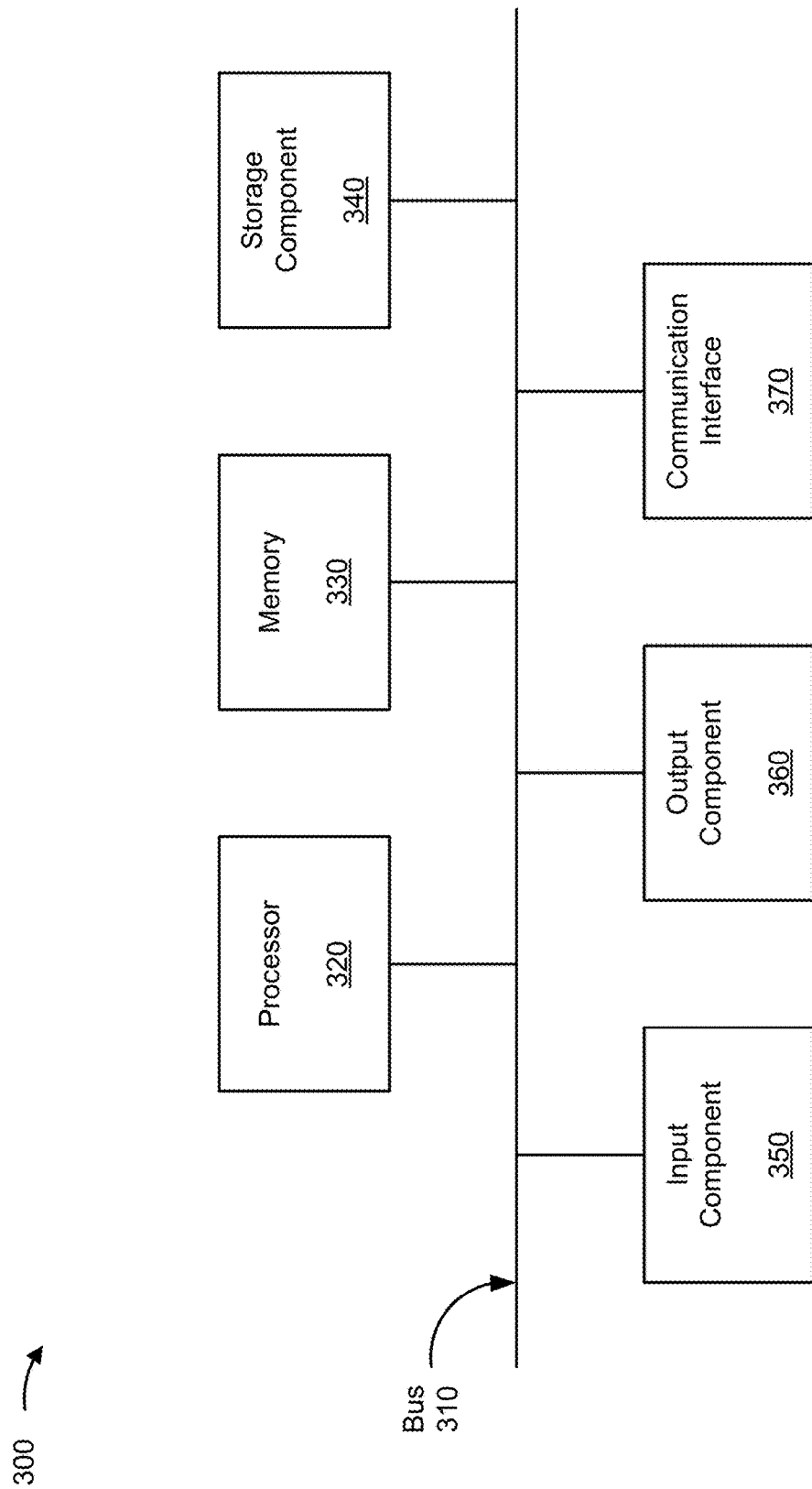
FIG. 3 is a diagram of example components of one or more devices of FIG. 2.

FIG. 3 is a diagram of example components of a device 300. Device 300 may correspond to client device 210, document processing platform 220, and/or computing resource 225. In some implementations, client device 210, document processing platform 220, and/or computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein.

Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
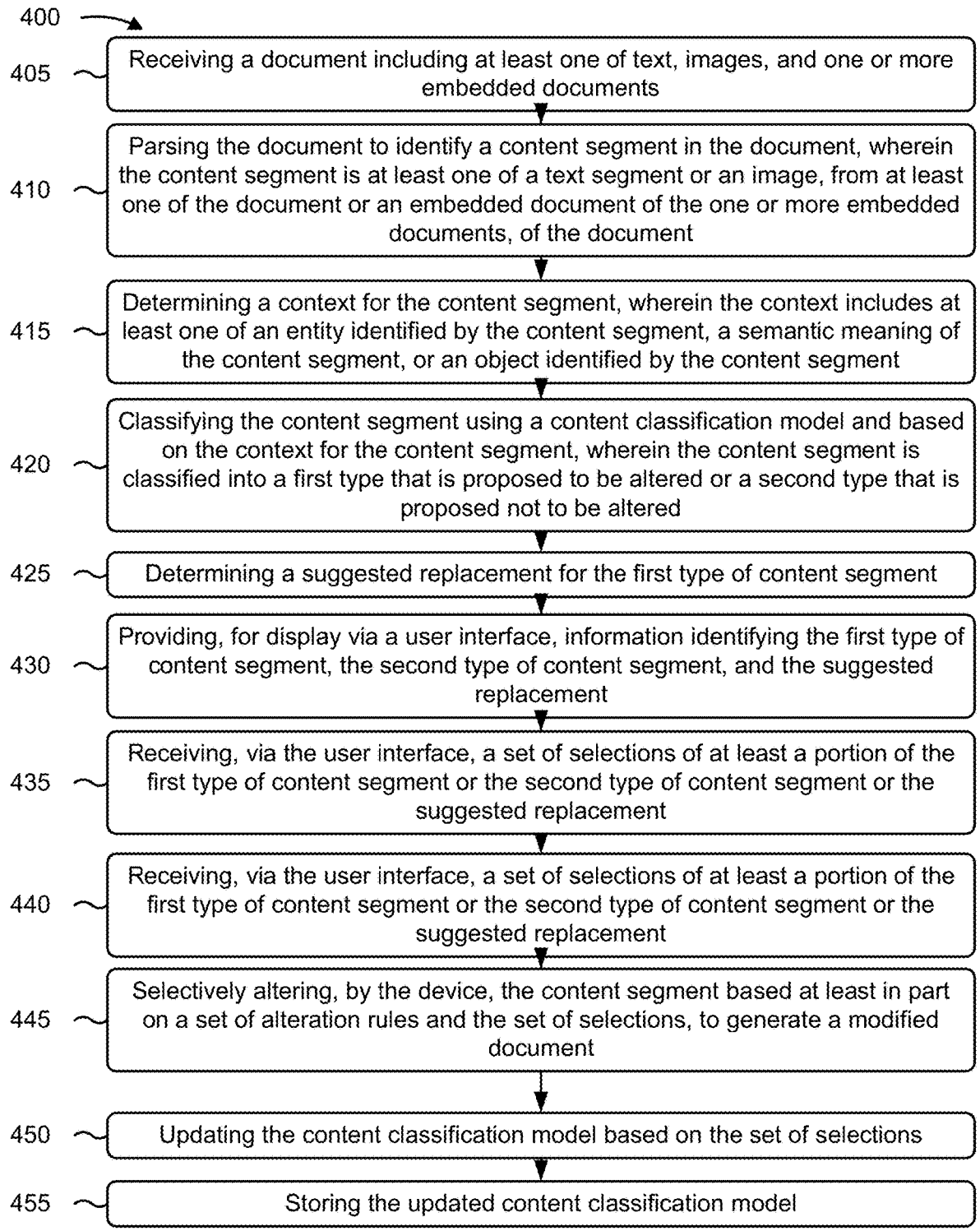
FIGS. 4-6 are flow charts of example processes for document content classification and alteration.

FIG. 4 is a flow chart of an example process 400 for document content classification and alteration. In some implementations, one or more process blocks of FIG. 4 may be performed by a document processing platform (e.g., document processing platform 220). In some implementations, one or more process blocks of FIG. 4 may be performed by another device or a group of devices separate from or including the document processing platform, such as a client device (e.g., client device 210) and/or the like.

As shown in FIG. 4, process 400 may include receiving a document including at least one of text, images, and one or more embedded documents (block 405). For example, the document processing platform (e.g., using processor 320, memory 330, storage component 340, input component 350, output component 360, communication interface 370 and/or the like) may receive a document including at least one of text, images, and one or more embedded documents, as described above.

As further shown in FIG. 4, process 400 may include parsing the document to identify a content segment in the document, wherein the content segment is at least one of a text segment or an image, from at least one of the document or an embedded document of the one or more embedded documents, of the document (block 410). For example, the document processing platform (e.g., using processor 320, memory 330, storage component 340, input component 350, output component 360, communication interface 370 and/or the like) may parse the document to identify a content segment in the document, as described above. In some implementations, the content segment is at least one of a text segment or an image, from at least one of the document or an embedded document of the one or more embedded documents, of the document.

As further shown in FIG. 4, process 400 may include determining a context for the content segment, wherein the context includes at least one of an entity identified by the content segment, a semantic meaning of the content segment, or an object identified by the content segment (block 415). For example, the document processing platform (e.g., using processor 320, memory 330, storage component 340, input component 350, output component 360, communication interface 370 and/or the like) may determine a context for the content segment, as described above. In some implementations, the context includes at least one of an entity identified by the content segment, a semantic meaning of the content segment, or an object identified by the content segment.

As further shown in FIG. 4, process 400 may include classifying the content segment using a content classification model and based on the context for the content segment, wherein the content segment is classified into a first type that is proposed to be altered or a second type that is proposed not to be altered (block 420). For example, the document processing platform (e.g., using processor 320, memory 330, storage component 340, input component 350, output component 360, communication interface 370 and/or the like) may classify the content segment using a content classification model and based on the context for the content segment, as described above. In some implementations, the content segment is classified into a first type that is proposed to be altered or a second type that is proposed not to be altered.

As further shown in FIG. 4, process 400 may include determining a suggested replacement for the first type of content segment (block 425). For example, the document processing platform (e.g., using processor 320, memory 330, storage component 340, input component 350, output component 360, communication interface 370 and/or the like) may determine a suggested replacement for the first type of content segment, as described above.

As further shown in FIG. 4, process 400 may include providing, for display via a user interface, information identifying the first type of content segment, the second type of content segment, and the suggested replacement (block 430). For example, the document processing platform (e.g., using processor 320, memory 330, storage component 340, input component 350, output component 360, communication interface 370 and/or the like) may provide, for display via a user interface, information identifying the first type of content segment, the second type of content segment, and the suggested replacement, as described above.

As further shown in FIG. 4, process 400 may include receiving, via the user interface, a set of selections of at least a portion of the first type of content segment or the second type of content segment or the suggested replacement (block 435). For example, the document processing platform (e.g., using processor 320, memory 330, storage component 340, input component 350, output component 360, communication interface 370 and/or the like) may receive, via the user interface, a set of selections of at least a portion of the first type of content segment or the second type of content segment or the suggested replacement, as described above.

As further shown in FIG. 4, process 400 may include selectively altering the content segment based on a set of alternation rules and the set of selections to generate a modified document (block 440). For example, the document processing platform (e.g., using processor 320, memory 330, storage component 340, input component 350, output component 360, communication interface 370 and/or the like) may selectively alter the content segment based on a set of alternation rules and the set of selections to generate a modified document, as described above.

As further shown in FIG. 4, process 400 may include providing the modified document based on selectively altering the content segment (block 445). For example, the document processing platform (e.g., using processor 320, memory 330, storage component 340, input component 350, output component 360, communication interface 370 and/or the like) may provide the modified document based on selectively altering the content segment, as described above.

As further shown in FIG. 4, process 400 may include updating the content classification model based on the set of selections (block 450). For example, the document processing platform (e.g., using processor 320, memory 330, storage component 340, input component 350, output component 360, communication interface 370 and/or the like) may update the content classification model based on the set of selections, as described above.

As further shown in FIG. 4, process 400 may include storing the updated content classification model (block 455). For example, the document processing platform (e.g., using processor 320, memory 330, storage component 340, input component 350, output component 360, communication interface 370 and/or the like) may store the updated content classification model, as described above.

Process 400 may include additional implementations, such as any single implementation or any combination of implementations described below and/or in connection with one or more other processes described elsewhere herein.

In a first implementation, process 400 includes obtaining a training data set including a plurality of documents; training, using the training data set and a machine learning technique, the content classification model; and storing the content classification model for use in classifying the document.

In a second implementation, alone or in combination with the first implementation, parsing the document includes identifying the one or more embedded documents within the document; extracting one or more content segments from the one or more embedded documents, and including the one or more extracted content segments in a set of content segments for classification and selective alteration.

In a third implementation, alone or in combination with one or more of the first and second implementations, classifying the content segment includes comparing the content segment to at least one list to determine whether to classify the content segment into the first type or the second type, and the at least one list includes at least one of a blacklist associated with the first type or a whitelist associated with the second type.

In a fourth implementation, alone or in combination with one or more of the first through third implementations, altering the content segment includes obscuring the content segment.

In a fifth implementation, alone or in combination with one or more of the first through fourth implementations, altering the content segment includes identifying another content segment with another context, the other context and the context are associated with a threshold similarity score, and replacing the content segment with the other content segment in the modified document.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
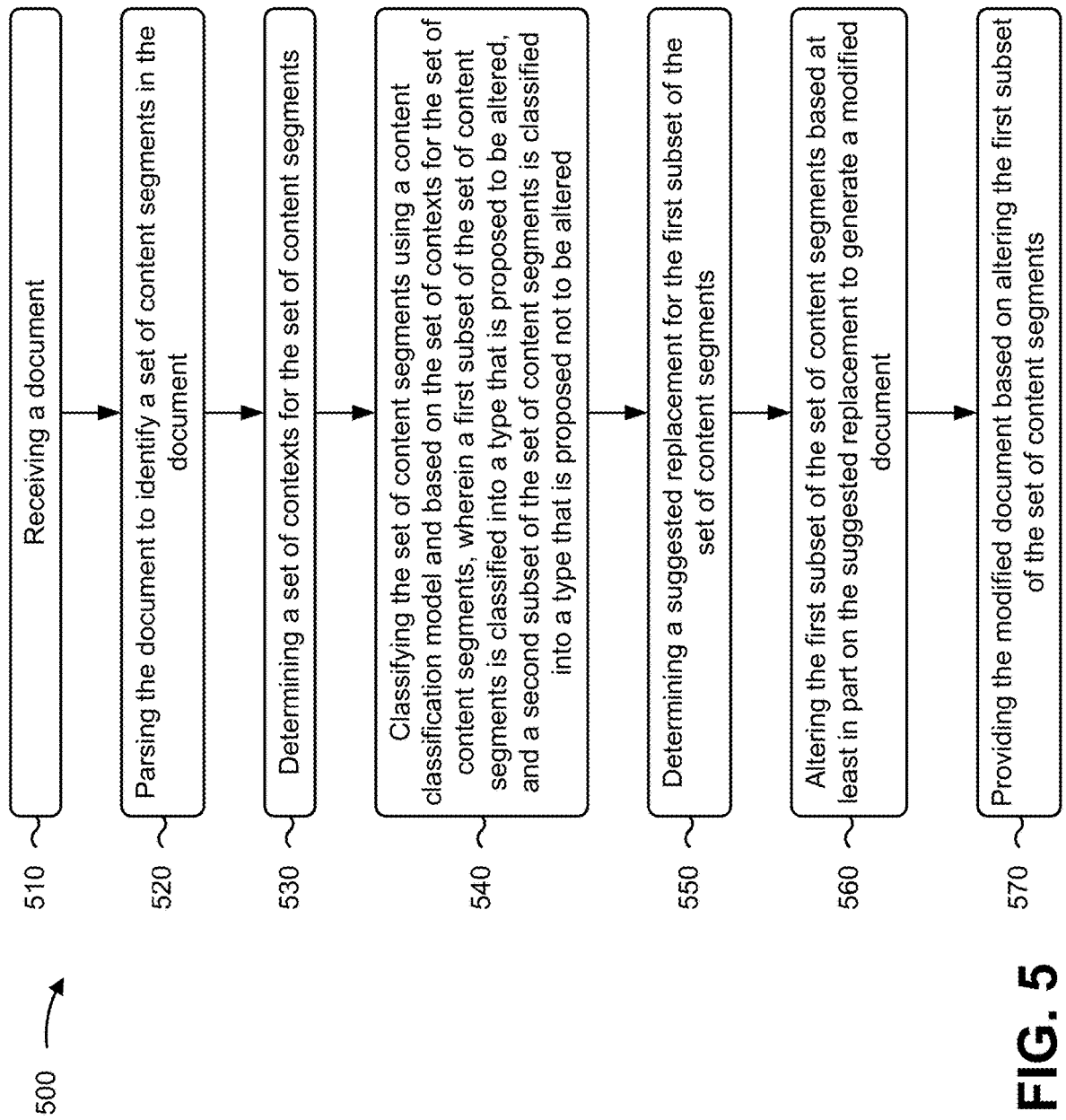

FIG. 5 is a flow chart of an example process 500 for document content classification and alteration. In some implementations, one or more process blocks of FIG. 5 may be performed by a document processing platform (e.g., document processing platform 20). In some implementations, one or more process blocks of FIG. 5 may be performed by another device or a group of devices separate from or including the document processing platform, such as a client device (e.g., client device 210) and/or the like.

As shown in FIG. 5, process 500 may include receiving a document (block 510). For example, the document processing platform (e.g., using processor 320, memory 330, storage component 340, input component 350, output component 360, communication interface 370 and/or the like) may receive a document, as described above.

As further shown in FIG. 5, process 500 may include parsing the document to identify a set of content segments in the document (block 520). For example, the document processing platform (e.g., using processor 320, memory 330, storage component 340, input component 350, output component 360, communication interface 370 and/or the like) may parse the document to identify a set of content segments in the document, as described above.

As further shown in FIG. 5, process 500 may include determining a set of contexts for the set of content segments (block 530). For example, the document processing platform (e.g., using processor 320, memory 330, storage component 340, input component 350, output component 360, communication interface 370 and/or the like) may determine a set of contexts for the set of content segments, as described above.

As further shown in FIG. 5, process 500 may include classifying the set of content segments using a content classification model and based on the set of contexts for the set of content segments, wherein a first subset of the set of content segments is classified into a type that is proposed to be altered, and a second subset of the set of content segments is classified into a type that is proposed not to be altered (block 540). For example, the document processing platform (e.g., using processor 320, memory 330, storage component 340, input component 350, output component 360, communication interface 370 and/or the like) may classify the set of content segments using a content classification model and based on the set of contexts for the set of content segments, as described above. In some implementations, a first subset of the set of content segments is classified into a type that is proposed to be altered, and a second subset of the set of content segments is classified into a type that is proposed not to be altered.

As further shown in FIG. 5, process 500 may include determining a suggested replacement for the first subset of the set of content segments (block 550). For example, the document processing platform (e.g., using processor 320, memory 330, storage component 340, input component 350, output component 360, communication interface 370 and/or the like) may determine a suggested replacement for the first subset of the set of content segments, as described above.

As further shown in FIG. 5, process 500 may include altering the first subset of the set of content segments based at least in part on the suggested replacement to generate a modified document (block 560). For example, the document processing platform (e.g., using processor 320, memory 330, storage component 340, input component 350, output component 360, communication interface 370 and/or the like) may alter the first subset of the set of content segments based at least in part on the suggested replacement to generate a modified document, as described above.

As further shown in FIG. 5, process 500 may include providing the modified document based on altering the first subset of the set of content segments (block 570). For example, the document processing platform (e.g., using processor 320, memory 330, storage component 340, input component 350, output component 360, communication interface 370 and/or the like) may provide the modified document based on altering the first subset of the set of content segments, as described above.

Process 500 may include additional implementations, such as any single implementation or any combination of implementations described below and/or in connection with one or more other processes described elsewhere herein.

In a first implementation, process 500 includes identifying, for a first content segment of the first subset of the set of content segments with a first context, a second content segment with a second context, wherein the first context is being a first semantic context and the second context is a second semantic context, wherein the first semantic context and the second semantic context is having a threshold semantic similarity score; and replacing the first content segment with the second content segment in the modified document.

In a second implementation, alone or in combination with the first implementation, process 500 includes removing a content segment of the first subset of the set of content segments from the modified document.

In a third implementation, alone or in combination with one or more of the first and second implementations, process 500 includes obscuring a content segment of the first subset of the set of content segments in the modified document.

In a fourth implementation, alone or in combination with one or more of the first through third implementations, process 500 includes classifying a content segment as confidential information; and assigning the content segment to the first subset of the set of content segments based on classifying the content segment as confidential information.

In a fifth implementation, alone or in combination with one or more of the first through fourth implementations, the document relates to a particular industry and the set of contexts includes one or more industry-specific contexts associated with the particular industry.

In a sixth implementation, alone or in combination with one or more of the first through fifth implementations, process 500 includes determining a risk score for a content segment based on a context for the content segment; and assigning the content segment to the first subset of the set of content segments or the second subset of the set of content segments based on the risk score.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
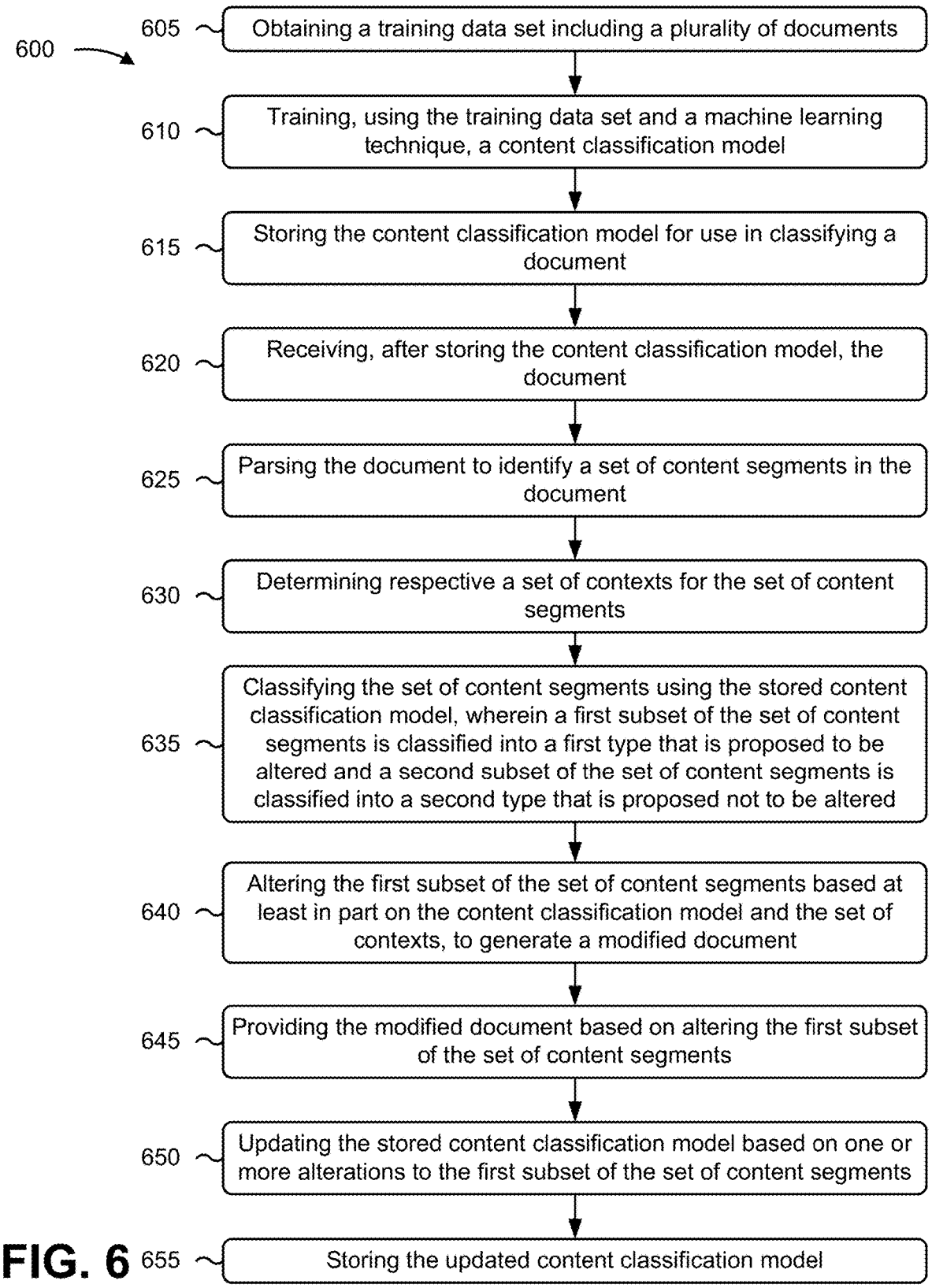

FIG. 6 is a flow chart of an example process 600 for document content classification and alteration. In some implementations, one or more process blocks of FIG. 6 may be performed by a document processing platform (e.g., document processing platform 220). In some implementations, one or more process blocks of FIG. 6 may be performed by another device or a group of devices separate from or including the document processing platform, such as a client device (e.g., client device 210) and/or the like.

As shown in FIG. 6, process 600 may include obtaining a training data set including a plurality of documents (block 605). For example, the document processing platform (e.g., using processor 320, memory 330, storage component 340, input component 350, output component 360, communication interface 370 and/or the like) may obtain a training data set including a plurality of documents, as described above.

As further shown in FIG. 6, process 600 may include training, using the training data set and a machine learning technique, a content classification model (block 610). For example, the document processing platform (e.g., using processor 320, memory 330, storage component 340, input component 350, output component 360, communication interface 370 and/or the like) may train, using the training data set and a machine learning technique, a content classification model, as described above.

As further shown in FIG. 6, process 600 may include storing the content classification model for use in classifying a document (block 615). For example, the document processing platform (e.g., using processor 320, memory 330, storage component 340, input component 350, output component 360, communication interface 370 and/or the like) may store the content classification model for use in classifying a document, as described above.

As further shown in FIG. 6, process 600 may include receiving, after storing the content classification model, the document (block 620). For example, the document processing platform (e.g., using processor 320, memory 330, storage component 340, input component 350, output component 360, communication interface 370 and/or the like) may receive, after storing the content classification model, the document, as described above.

As further shown in FIG. 6, process 600 may include parsing the document to identify a set of content segments in the document (block 625). For example, the document processing platform (e.g., using processor 320, memory 330, storage component 340, input component 350, output component 360, communication interface 370 and/or the like) may parse the document to identify a set of content segments in the document, as described above.

As further shown in FIG. 6, process 600 may include determining respective a set of contexts for the set of content segments (block 630). For example, the document processing platform (e.g., using processor 320, memory 330, storage component 340, input component 350, output component 360, communication interface 370 and/or the like) may determine respective a set of contexts for the set of content segments, as described above.

As further shown in FIG. 6, process 600 may include classifying the set of content segments using the stored content classification model, wherein a first subset of the set of content segments is classified into a first type that is proposed to be altered and a second subset of the set of content segments is classified into a second type that is proposed not to be altered (block 635). For example, the document processing platform (e.g., using processor 320, memory 330, storage component 340, input component 350, output component 360, communication interface 370 and/or the like) may classify the set of content segments using the stored content classification model, as described above. In some implementations, a first subset of the set of content segments is classified into a first type that is proposed to be altered and a second subset of the set of content segments is classified into a second type that is proposed not to be altered.

As further shown in FIG. 6, process 600 may include altering the first subset of the set of content segments based at least in part on the content classification model and the set of contexts, to generate a modified document (block 640). For example, the document processing platform (e.g., using processor 320, memory 330, storage component 340, input component 350, output component 360, communication interface 370 and/or the like) may alter the first subset of the set of content segments based at least in part on the content classification model and the set of contexts, to generate a modified document, as described above.

As further shown in FIG. 6, process 600 may include providing the modified document based on altering the first subset of the set of content segments (block 645). For example, the document processing platform (e.g., using processor 320, memory 330, storage component 340, input component 350, output component 360, communication interface 370 and/or the like) may provide the modified document based on altering the first subset of the set of content segments, as described above.

As further shown in FIG. 6, process 600 may include updating the stored content classification model based on one or more alterations to the first subset of the set of content segments (block 650). For example, the document processing platform (e.g., using processor 320, memory 330, storage component 340, input component 350, output component 360, communication interface 370 and/or the like) may update the stored content classification model based on one or more alterations to the first subset of the set of content segments, as described above.

As further shown in FIG. 6, process 600 may include storing the updated content classification model (block 655). For example, the document processing platform (e.g., using processor 320, memory 330, storage component 340, input component 350, output component 360, communication interface 370 and/or the like) may store the updated content classification model, as described above.

Process 600 may include additional implementations, such as any single implementation or any combination of implementations described below and/or in connection with one or more other processes described elsewhere herein.

In a first implementation, process 600 includes determining a suggested replacement for the first type of content segment; providing, for display via a user interface, information identifying the first type of content segment, the second type of content segment, and the suggested replacement; and receiving, via the user interface, a set of selections of at least a portion of the first type of content segment or the second type of content segment or the suggested replacement.

In a second implementation, alone or in combination with the first implementation, process 600 includes automatically publishing the document to another device.

In a third implementation, alone or in combination with one or more of the first and second implementations, a context, of the set of contexts, for a content segment, of the set of content segments, includes information identifying at least one of: a meaning of the content segment, an organization associated with the content segment, or a contact information associated with the content segment.

In a fourth implementation, alone or in combination with one or more of the first through third implementations, process 600 includes classifying a content segment of the set of content segments based on at least one of: an industry of the content segment, or a synonym of the content segment.

In a fifth implementation, alone or in combination with one or more of the first through fourth implementations, process 600 includes processing data of the document using an entity recognition model; and extracting the set of content segments is basing on a result of processing the data of the document.

In a sixth implementation, alone or in combination with one or more of the first through fifth implementations, the document is a dynamic document, and modify the dynamic document in real-time.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method, comprising:
 receiving, by a device, a document including at least one of text, images, and one or more embedded documents;

parsing, by the device, the document to identify a content segment in the document,
  wherein the content segment is at least one of a text segment or an image, from at least one of the images of the document or an embedded document of the one or more embedded documents of the document, and
  wherein the content segment has multiple possible semantic meanings based on different types of context;
determining, by the device, a context for the content segment,
  wherein the context is determined based on using natural language processing of other words that are outside the content segment in the document to determine a semantic meaning, from the multiple possible semantic meanings, of the content segment;
classifying, by the device, the content segment using a content classification model and based on the context for the content segment,
  wherein the content segment is classified into a first type of content segment that is proposed to be altered or a second type of content segment that is proposed to remain unaltered;
determining, by the device and based on classifying the content segment into the first type of content segment, a suggested replacement for the first type of content segment;
providing, by the device and for display via a user interface, information identifying the content segment, the first type of content segment, and the suggested replacement;
receiving, by the device and via the user interface, a set of selections associated with the information identifying the content segment, the first type of content segment, and the suggested replacement;
selectively altering, by the device, the content segment based at least in part on a set of alteration rules, the semantic meaning, and the set of selections, to generate a modified document,
  wherein the content segment is altered to a generic version of the content segment to preserve a threshold quantity of the semantic meaning;
providing, by the device, the modified document based on selectively altering the content segment;
updating, by the device, the content classification model based on the set of selections; and
storing, by the device, the updated content classification model.

2. The method of claim 1, further comprising:
obtaining a training data set including a plurality of other documents;
training, using the training data set and a machine learning technique, the content classification model; and
storing the content classification model for use in classifying the document.

3. The method of claim 1, wherein parsing the document comprises:
identifying the one or more embedded documents within the document;
extracting one or more content segments from the one or more embedded documents; and
including the one or more extracted content segments in a set of content segments for classification and selective alteration.

4. The method of claim 1, wherein classifying the content segment comprises:
comparing the content segment to at least one list to determine whether to classify the content segment into the first type of content segment or the second type of content segment, and
wherein the at least one list includes at least one of:
  a blacklist associated with the first type of content segment, or
  a whitelist associated with the second type of content segment.

5. The method of claim 1, wherein altering the content segment comprises:
obscuring the content segment.

6. The method of claim 1, wherein altering the content segment comprises:
identifying another content segment having another context,
  wherein the other context and the context are associated with a threshold similarity score; and
replacing the content segment with the other content segment in the modified document.

7. A device, comprising:
one or more memories; and
one or more processors communicatively coupled to the one or more memories, the one or more processors configured to:
receive a document;
parse the document to identify a set of content segments in the document;
determine a set of contexts for the set of content segments,
  wherein the set of contexts is determined based on using natural language processing of other words that are outside the set of content segments in the document to determine a respective set of semantic meanings of the set of content segments;
classify the set of content segments using a content classification model and based on the set of contexts for the set of content segments,
  wherein a first subset of the set of content segments is classified into a type of content segment that is proposed to be altered, and a second subset of the set of content segments is classified into a type of content segment that is proposed to remain unaltered;
determine a suggested replacement based on the respective set of semantic meanings for the type of content segment;
provide, for display via a user interface, information identifying the first subset of the set of content segments, the second subset of the set of content segments, and the suggested replacement;
receive, via the user interface, a set of selections associated with the displayed information identifying the first subset of the set of content segments and the suggested replacement;
alter the first subset of the set of content segments based at least in part on the suggested replacement to generate a modified document,
  wherein the one or more processors, when selectively altering the content segment, are to:
    alter the content segment based on the set of selections, or
    retain the content segment based on the set of selections; and
provide the modified document based on altering the first subset of the set of content segments.

8. The device of claim 7, wherein the one or more processors are further configured to:
    identify, for a first content segment of the first subset of the set of content segments with a first context, a second content segment with a second context,
        wherein the first context is a first semantic context and the second context is a second semantic context,
        wherein the first semantic context and the second semantic context have a threshold semantic similarity score; and
    replace the first content segment with the second content segment in the modified document.

9. The device of claim 7, wherein the one or more processors, when altering the first subset of the set of content segments, are configured to:
    remove a content segment of the first subset of the set of content segments from the modified document.

10. The device of claim 7, wherein the one or more processors, when altering the first subset of the set of content segments, are configured to:
    obscure a content segment of the first subset of the set of content segments in the modified document.

11. The device of claim 7, wherein the one or more processors, when classifying the set of content segments, are configured to:
    classify a content segment as confidential information; and
    assign the content segment to the first subset of the set of content segments based on classifying the content segment as confidential information.

12. The device of claim 7, wherein the document relates to a particular industry and the set of contexts includes one or more industry-specific contexts associated with the particular industry.

13. The device of claim 7, wherein the one or more processors, when classifying the set of content segments, are configured to:
    determine a risk score for a content segment, of the content segments, based on a context for the content segment; and
    assign the content segment to the first subset of the set of content segments or the second subset of the set of content segments based on the risk score.

14. A non-transitory computer-readable medium storing instructions, the instructions comprising:
    one or more instructions that, when executed by one or more processors, cause the one or more processors to:
        obtain a training data set including a plurality of documents;
        train, using the training data set and a machine learning technique, a content classification model;
        store the content classification model for use in classifying a document;
        receive, after storing the content classification model, the document;
        parse the document to identify a set of content segments in the document;
        determine a respective set of contexts for the set of content segments,
            wherein the respective set of contexts is determined based on using natural language processing of other words that are outside the set of content segments in the document to determine a respective set of semantic meanings of the set of content segments;
        classify the set of content segments using the stored content classification model,
            wherein a first subset of the set of content segments is classified into a first type of content segment that is proposed to be altered and a second subset of the set of content segments is classified into a second type of content segment that is proposed to remain unaltered;
        alter the first subset of the set of content segments, based on classifying the set of content segments, to generate a modified document;
        provide the modified document based on altering the first subset of the set of content segments;
        update the stored content classification model based on one or more alterations to the first subset of the set of content segments; and
        store the updated content classification model.

15. The non-transitory computer-readable medium of claim 14, wherein the one or more instructions, when executed by the one or more processors, further cause the one or more processors to:
    determine a suggested replacement for the first type of content segment;
    provide, for display via a user interface, information identifying the first type of content segment, the second type of content segment, and the suggested replacement; and
    receive, via the user interface, a set of selections associated with the first type of content segment or the second type of content segment or the suggested replacement.

16. The non-transitory computer-readable medium of claim 14, wherein the one or more instructions, that cause the one or more processors to provide the document, cause the one or more processors to:
    automatically publish the document to another device.

17. The non-transitory computer-readable medium of claim 14, wherein a context, of the set of contexts, for a content segment, of the set of content segments, includes information identifying at least one of:
    a meaning of the content segment,
    an organization associated with the content segment, or
    a contact information associated with the content segment.

18. The non-transitory computer-readable medium of claim 14, wherein the one or more instructions, that cause the one or more processors to classify the set of content segments, cause the one or more processors to:
    classify a content segment of the set of content segments based on at least one of:
        an industry of the content segment, or
        a synonym of the content segment.

19. The non-transitory computer-readable medium of claim 14, wherein the one or more instructions, that cause the one or more processors to parse the document, cause the one or more processors to:
    process data of the document using an entity recognition model; and
    extract the set of content segments based on a result of processing the data of the document.

20. The non-transitory computer-readable medium of claim 14, wherein the document is a dynamic document; and
    wherein the one or more instructions, that cause the one or more processors to provide the modified document, cause the one or more processors to:
        modify the dynamic document in real-time.

* * * * *